United States Patent [19]

Loichinger et al.

[11] Patent Number: 4,501,196

[45] Date of Patent: Feb. 26, 1985

[54] PROCESS VAT CUTTING AND STIRRING MECHANISM

[76] Inventors: Fred A. Loichinger, 807 Westview St., Cleveland, Wis. 53015; Meredith C. Thomson, 806 Grand Ave., Sheboygan, Wis. 53081

[21] Appl. No.: 441,759

[22] Filed: Nov. 15, 1982

[51] Int. Cl.³ .................. A01J 25/00; A23C 19/00
[52] U.S. Cl. ........................... 99/461; 99/460; 366/261; 366/289; 366/334; 426/582
[58] Field of Search .............. 99/452, 460, 464, 465, 99/466, 461-463; 366/261, 289, 332, 334, 325; 426/582, 586

[56] References Cited

U.S. PATENT DOCUMENTS 2,814,114  11/1957  Nessler et al. ............... 99/463 X

FOREIGN PATENT DOCUMENTS 127139  4/1948  Australia ..................... 99/460

Primary Examiner—Timothy F. Simone
Attorney, Agent, or Firm—James E. Lowe, Jr.

[57] ABSTRACT

An apparatus for processing a mixture to produce a product such as cottage cheese. The apparatus comprises a vat for holding the mixture, a paddle for stirring the mixture, a cutting knife for cutting the product, a carriage for supporting the cutting knife and the paddle above the vat and a mechanism for moving the cutting knife and the paddle horizontally along the vat. The apparatus also includes a mechanism for mechanically retracting the paddle from the mixture so that the cutting knife can be extended into the product, a mechanism for connecting the cutting knife to the carriage and for extending the knife into the vat and for extracting the knife from the vat, and a mechanism for causing reciprocative movement at regular intervals of the cutting knife perpendicular to the path of travel of the carriage.

16 Claims, 4 Drawing Figures

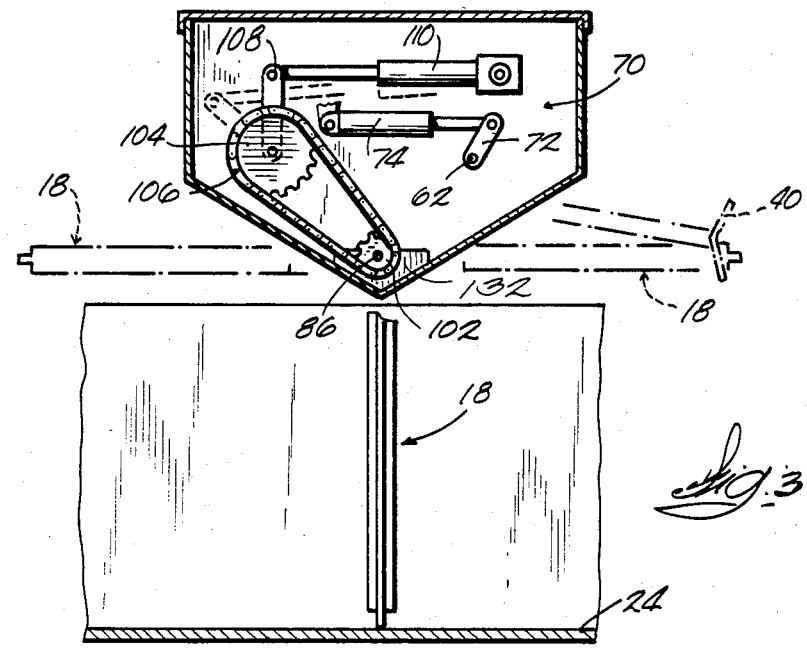
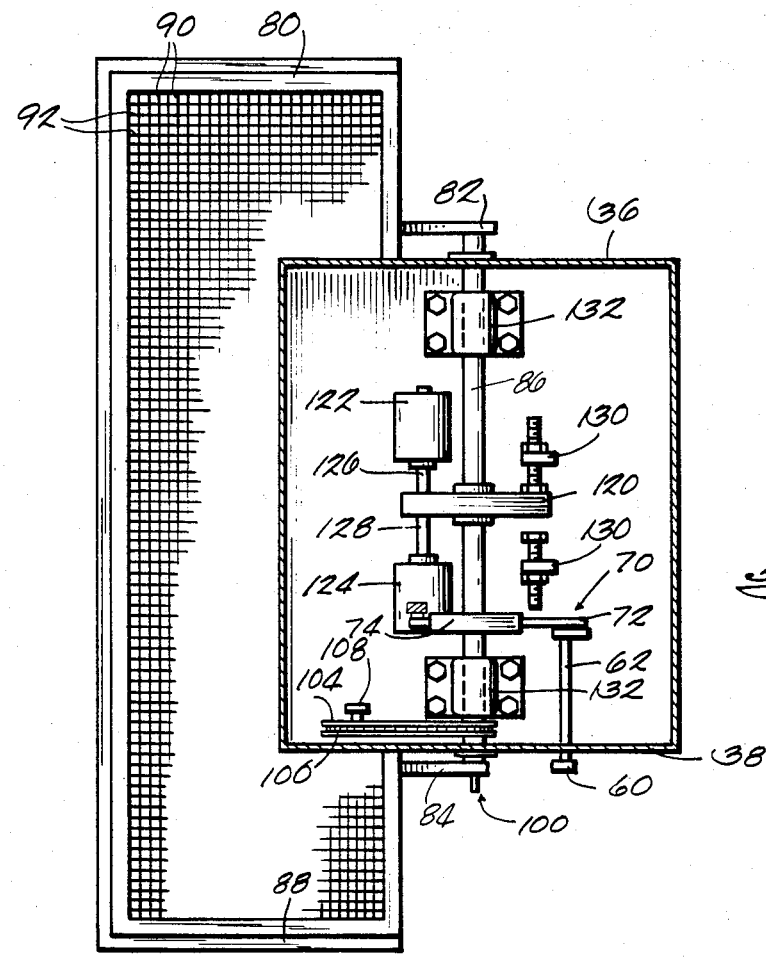

PROCESS VAT CUTTING AND STIRRING MECHANISM

BACKGROUND AND SUMMARY OF THE INVENTION

This invention relates to process vat cutting mechanisms and, more particularly, to process vat stirring and cutting mechanisms used in combination. The invention will be discussed in connection with a cheese processing vat, specifically processing cottage cheese, but the invention can also be used to process various other cheeses and similar media.

When products such as cottage cheese are made in a process vat, a mechanical stirring paddle is positioned over the open vat to stir the mixture which will eventually become cottage cheese. After the mixture coagulates, the cottage cheese curds must be cut into cubes to facilitate the draining of whey away from the curds.

Under current practice a curd knife separate from the mixture stirring assembly is moved along the narrow process vat to cut the curd into elongated narrow strips. Another curd knife is then used to slice across the narrow strips of curd to cut the curds into cubes. Since the slicing of the strips is done by hand, the process vat must be narrow enough to allow persons to easily handle the curd knife for cutting the curd strips.

This invention provides an apparatus for processing a mixture to produce a product such as cottage cheese. The apparatus comprises a holding tank for holding the mixture, a cutting device for cutting the product and a support structure for supporting the cutting device above the holding tank. The apparatus also includes moving machinery for moving the support structure horizontally along the holding tank, and means for causing reciprocative movement at regular intervals of the cutting device perpendicular to the path of travel of the support structure.

This invention also provides an apparatus comprising a holding tank for holding the mixture, stirring equipment for stirring the mixture, a cutting device for cutting the product and a support structure for supporting the cutting device and the stirring equipment above the holding tank. The apparatus also includes moving machinery for moving the cutting device and the stirring equipment horizontally along the holding tank, and means for mechanically retracting the stirring equipment from the mixture so that the cutting device can be extended into the product.

In one embodiment, the holding tank for holding the mixture comprises a vat, the stirring equipment comprises a paddle and the cutting device comprises a cutting knife including a frame, a first set of spaced cutting wires extending between opposite sides of the frame, and a second set of spaced cutting wires extending perpendicularly to the first set of spaced cutting wires and between opposite sides of the frame.

A principal object of this invention is to provide a process vat with a combination stirring and cutting mechanism.

Another object of this invention is to provide such a mechanism which will allow for stirring or cutting to occur without having to remove a stirring paddle or a cutting knife in order to cut or stir.

Another principal object of this invention is to provide a process vat with an automatic curd cutting mechanism which will cut the curd into cubes.

Another object of this invention is to provide such a mechanism which will allow processed vats to be wider than currently used by virtue of having eliminated the need for hand cutting of the curd.

BRIEF DESCRIPTION OF THE DRAWINGS

FIG. 3 is a broken away side view of the mechanism shown in FIG. 2.

FIG. 4 is a broken away top view of a cutting knife portion of the mechanism shown in FIG. 2.

DESCRIPTION OF THE PREFERRED EMBODIMENT

Figure 1:
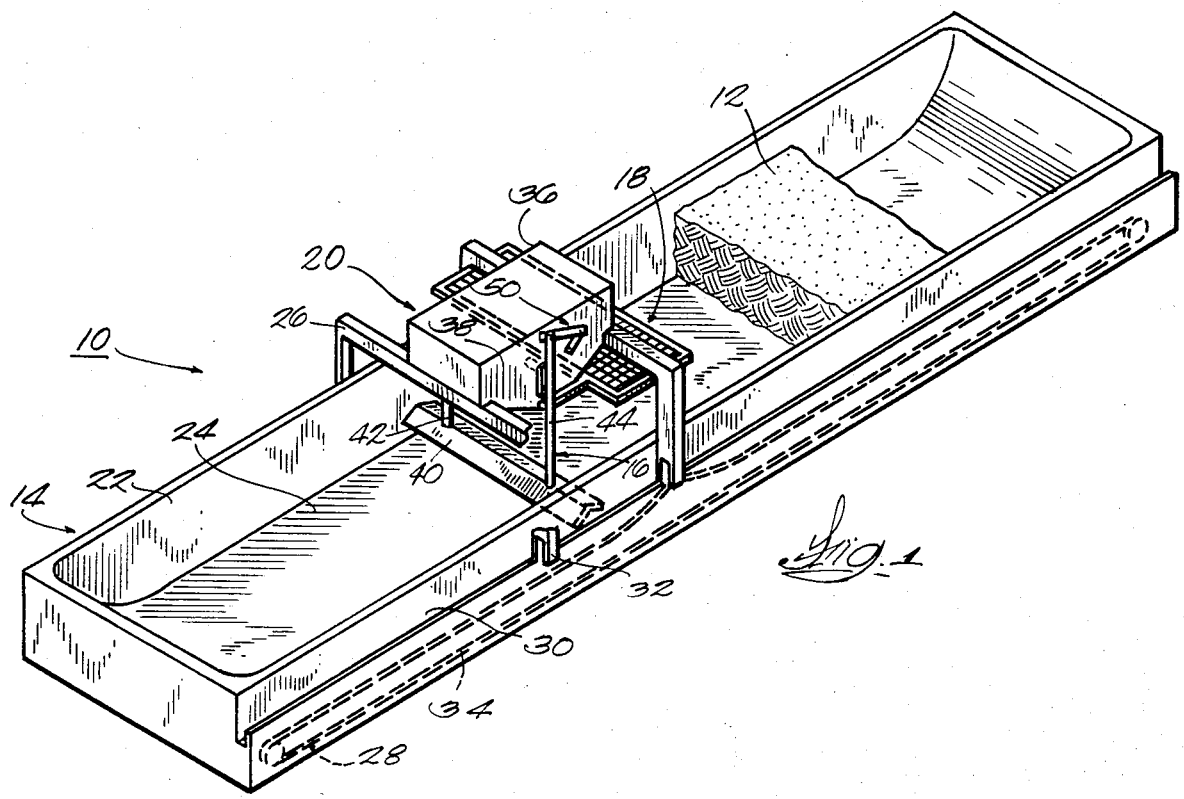
FIG. 1 is a perspective view of a process vat including various features of the invention.

As illustrated in the drawings, this invention provides an apparatus 10 for processing a mixture such as milk and enzymes to produce a product 12 such as cottage cheese. The apparatus 10 comprises a holding tank 14 for holding the mixture which will become cottage cheese, stirring equipment 16 extendable into the holding tank 14 to stir the mixture, a cutting device 18 extendable into the holding tank to cut the curd and support structure 20 for supporting the stirring equipment 16 and cutting device 18 above the holding tank 14.

The holding tank or vat 14 comprises a generally rectangular vessel with spaced vertical side walls 22 and a bottom wall 24. The front and rear side walls are curved inwardly near the bottom wall 24 to insure all of the product 112 is cut by the cutting device 18, as hereinafter described.

Positioned above the open vat 14 is the supporting structure or carriage 20. The carriage 20 is mounted on support brackets 26 and the carriage 20 positions the stirring equipment or paddle 16 and the cutting device or curd knife 18 above the vat 14.

The apparatus 10 also includes moving machinery 28 to move the carriage 20 horizontally along the length of the vat 14. The moving machinery 28 comprises a pair of rails 30 with one on each side of the vat 14, and the rails receive ends 32 of the support brackets. The support bracket ends 32 are attached to a chain 34 which moves the carriage 20 along the vat 14 in either direction. The chain 34 in turn is connected to a variable speed motor (not shown). In other arrangements, the carriage 20 can be supported above the vat 14 by use of an overhead rail (not shown) positioned above the open vat 14.

Connected to opposite sides 38 and 38 of the carriage is the paddle 16 for stirring the mixture. The paddle 16 includes a blade 40 for stirring the mixture and two spaced apart members 42 and 44 which connect the blade 40 to the carriage 20. The paddle blade used depends on whether stirring of the mixture or creaming of the curd is desired, and the paddle 16 can be interchanged with other paddles when a different blade is desired.

Figure 2:
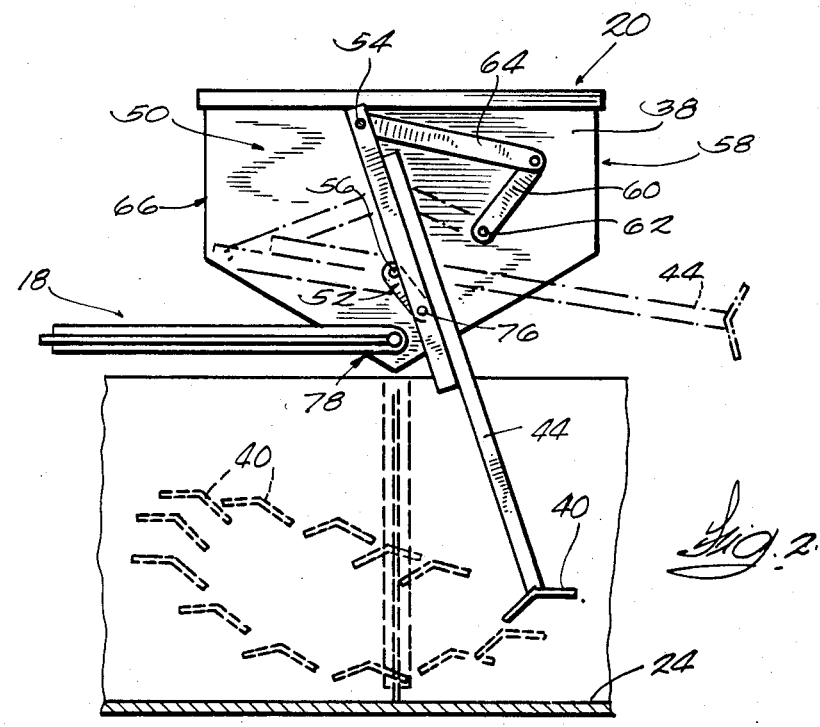
FIG. 2 is a side view of a portion of a mechanism shown in FIG. 1.

The paddle 16 is connected to the carriage 20 by an assemblage of cranks links and other machinery (hereafter referred to as stirrer connecting means shown generally at 50) for extending the paddle 16 into the mixture and for moving the paddle blade 40 in a generally elliptical pattern when the carriage 20 is stationary, as generally illustrated in FIG. 2. When this stirring motion is combined with horizontal movement of the carriage 20 along the vat 14, the paddle blade 40 defines a series of loops which serve to effectively agitate the mixture. The size of the loops can be varied by varying the rate of rotation of the paddle blade 40 or by varying the horizontal speed of the carriage 20.

Each paddle member 42 or 44 is connected to a side 36 or 38 of the carriage 20 by the stirrer connecting means. The stirrer connecting means on one side 38 of the carriage 20 will be described but the description will be applicable to the stirrer connecting means on the other side 36 of the carriage 20 as well.

The stirrer connecting means 50 comprises a rotatably driven crank 52 connected to the paddle member 44 near its upper end 54. The crank 52 is driven by an electrical motor (not shown) which is independent from the machinery 28 for moving the carriage 20 along the length of the vat 14.

Above the point of connection 56 of the rotatably driven crank 52 to the carriage 20 and toward the rear 58 of the carriage 20 is a first member of link 60. The first link 60 is pivotally connected to the side 38 of the carriage 20 by a shaft 62 extending through the side 38 of the carriage 20, and a second member or link 64 is pivotally connected to the first link 60 and the upper end 54 of the paddle member 44. The horizontal movement of the paddle's upper end 54 is thus limited by the second link 64 connected to the paddle's upper end 54 when the first link 60 is held stationary by retracting means hereinafter described. Accordingly, when the crank 52 is rotated in a counterclockwise or clockwise manner while the first link 60 is held stationary, the paddle blade 40 is lifted and lowered by the crank 52 and generally follows the elliptical pattern shown in FIG. 2.

The stirrer connecting means also permits the paddle member 44 to be rotated to the rear 58 of the carriage so the paddle blade 40 can be retracted from the mixture. When the paddle 16 is retracted, stirring paddles can be exchanged for creaming paddles or vice versa, and the paddles can be washed. To retract the paddle 16 from the mixture, the crank 52 is rotated toward the rear 58 of the carriage to where the crank 52 is only a few degrees below horizontal, as shown in FIG. 2. The first link 60 is then pivoted toward the front 66 of the carriage 20 by retracting means or assemblage (shown generally at 70) inside the carrige 20. The retracting means 70 comprises a lever 72 attached to the shaft 62, and means for moving the lever 72 or ball screw 74 attached to the lever 22. When the first link 60 is rotated counterclockwise, the second link 64 rotates the paddle member 44 counterclockwise about the point of attachment 76 of the paddle member 44 to the crank 52. As the paddle member 44 rotates the paddle 16 is lifted from the mixture.

Connected to the bottom 78 of the carriage 20 is the curd knife 18 for cutting the coagulum or curd 12 after the mixture coagulates. The curd knife 18 includes a frame 80 for cutting the curd and means for connecting the frame 80 to the carriage 20. The means for connecting the frame to the carriage comprises a pair of spaced apart parallel support members 82 and 84 extending between the frame 80 and a shaft 86 mounted in bearings 132 in the bottom 78 of the carriage 20.

The knife frame 80, as shown in FIG. 4, comprises a rectangular frame somewhat smaller than the transverse cross section of the vat 14. The outer edges of the frame include wipers 88 to facilitate the knife's scraping of the sides 22 and bottom 24 of the vat. Space, however, is provided between the blade wipers 88 and the walls of the vat 14 to allow the reciprocative horizontal movement of the cutting knife 18, as hereinafter described.

The cutting portion of the knife frame 80 comprises a first and second set of cutting wires extending between sides of the frame 80. The first set 90 of wires extend between opposite sides of the frame 80 and are spaced so as to cut the cottage cheese to provide an appropriate depth for each curd. The knife frame 80 also includes a second set 92 of spaced cutting wires extending between opposite sides of the frame 80 perpendicularly to the first set 90 of cutting wires. The second set 92 of cutting wires are spaced to cut the cottage cheese so each curd has an appropriate width.

Cutter connecting means 100 are provided for extending the cutting knife 18 into the curd 12 and for retracting the cutting knife 18 from the curd 12. The cutter connecting means 100 includes the shaft 86 to which the ends of the support members 82 and 84 are connected, and means for rotating the knife 18 and shaft 86 from a horizontal left or right position, out of the way of the stirring paddle 16, to a vertical position where the knife 18 can be moved along the vat 14 to cut the curd 12. The means for rotating the cutting knife 18 comprises a first sprocket 102 fixed on the shaft 86 and a second sprocket 104 rotatably attached to the carriage 20 above the first sprocket 102 and toward the front 66 of the carriage, as illustrated in FIG. 3. A chain 106 encircles the first and second sprockets 102 and 104 so as to driveably connect the sprockets. The diameter of the second sprocket 104 is larger than the diameter of first sprocket 102 so a small amount of rotational movement of the second sprocket 104 causes a comparatively large rotational movement of the first sprocket 102 and the shaft 86 to thus rotate the cutting knife 18.

The second sprocket 104 includes an actuator lever 108 which is connected to means for moving the lever 108. The means for moving the lever comprises a ball screw 110 attached to the lever 108. When the lever 108 is moved by the ball screw 110, the cutter knife 18 rotates.

As the knife 18 enters the curd 12 and assumes a vertical position, and is then moved along the vat 14 by the carriage 20, the first set 90 of cutting wires cuts the cottage cheese into horizontal slices and the second set 92 of cutting wires cuts the slices into elongated narrow strips.

As the knife 18 moves along the vat 14, means are provided for cutting the elongated strips of curd into cubes to facilitate draining of whey. The cube cutting occurs by reciprocatively moving the knife 18 at regular intervals perpendicularly to the path of travel of the carriage 20. When the knife 18 moves perpendicularly to the path of travel of the carriage 20, either the first or second sets 90 or 92 of cutting wires cuts the curd strips into cubes, the wires doing the cutting depending on whether the knife 18 is moved vertically or horizontally depending on the particular embodiment of the invention. In this embodiment, the knife 18 is moved horizontally so the second set 92 of cutting wires cuts the strips of curd into cubes.

As described earlier, the knife 18 is connected to the carrige 20 by the cutter connecting means 100. The cutter connecting means shaft 86 extends perpendicular to the path of travel of the carriage 20, and means are provided for reciprocatively moving the shaft 86 at regular intervals to move the knife 18 which is connected to the shaft 86.

More particularly, the means for moving the shaft 86 comprises a plate 120 mounted on the shaft 86 and extending perpendicularly from the shaft 86 between a pair of solenoids 122 and 124, as shown in FIG. 4. The solenoids 122 and 124 include cores 126 and 128 which move in response to electrical current supplied to the solenoids 122 and 124 at regular intervals by timing means (not shown). Each core 126 or 128 is connected to opposite sides of the plate 120, with one core 126 pushing the plate 120 and shaft 86 while the other core 128 retracts, and vice versa. In other arrangements a cam (not shown) driven by a motor (not shown) can be used to move the plate 120 and shaft 86. Stops 130 adjacent the plate 120 on the side of the shaft 86 opposite the solenoids 122 and 124 adjust the amount of reciprocative travel of the plate 120 and shaft 86.

It is to be understood that the invention is not confined to the particular construction and arrangement of parts herein illustrated and described but embraces all such modified forms thereof as come within the scope of the following claims.

We claim:

1. An apparatus for processing a mixture to produce a product such as cottage cheese, said apparatus comprising
    a holding tank for holding the product and including opposite ends,
    a cutting device for cutting the product,
    a support structure for supporting said cutting device above said holding tank, so that said cutting device can extend into the product,
    moving machinery for moving said cutting device horizontally along said holding tank so that said cutting device can cut the product in one direction, and
    means for causing reciprocative movement at regular intervals of said cutting device perpendicular to said one direction as said cutting device moves along said holding tank between said ends, so that said cutting device can cut the product in a direction perpendicular to said one direction.

2. An apparatus according to claim 1 wherein said holding tank comprises an elongated vat.

3. An apparatus according to claim 1 wherein said cutting device comprises a cutting knife including a frame which extends perpendicular to said one direction, a first set of spaced cutting wires extending between opposite sides of said frame, and a second set of spaced cutting wires extending perpendicularly to said first set of spaced cutting wires and between opposite sides of said frame.

4. An apparatus according to claim 1 wherein said moving machinery also moves said support structure horizontally along said holding tank and wherein said means for causing reciprocative movement at regular intervals of said cutting device perpendicular to said one direction comprises cutter connecting means for connecting said cutting device to said support structure, and reciprocative means for causing the reciprocative movement of said cutter connecting means at regular intervals perpendicular to said one direction as said support structure and said cutting device move along said holding tank.

5. An apparatus for processing a mixture to produce a product such as cottage cheese, said apparatus comprising a holding tank for holding the mixture, stirring equipment for stirring the mixture, a cutting device for cutting the product, a support structure for simultaneously supporting both said cutting device and said stirring equipment above said holding tank so that one of said cutting device and said stirring equipment can fully extend into the mixture or product, and means connected between said support structure and said stirring equipment for completely retracting said stirring equipment from the mixture so that said cutting device can be fully extended into the product.

6. An apparatus according to claim 5 wherein said holding tank comprises an elongated vat, and wherein said apparatus further includes moving machinery for moving said support structure, said cutting device and said stirring equipment longitudinally along said elongated vat.

7. An apparatus for processing a mixture to produce a product such as cottage cheese, said apparatus comprising a holding tank for holding the product, said tank including spaced apart side walls, a bottom wall extending between the lower edges of said side walls, and opposite arcuate ends formed by a front wall curved inwardly near said bottom wall and a rear wall curved inwardly near said bottom wall, a cutting device for cutting the product, and a support structure for supporting said cutting device above said holding tank so that said cutting device can extend into the product, said cutting device being pivotally attached to said support structure for pivotal movement throught the product at said arcuate ends.

8. An apparatus in accordance with claim 7 and further including moving machinery for moving said support structure and said cutting device horizontally along said holding tank.

9. An apparatus according to claim 7 wherein said holding tank is elongated.

10. An apparatus for processing a mixture to produce a product such as cottage cheese, said apparatus comprises a holding tank for holding the product, a cutting device for cutting the product, said cutting device comprising a cutting portion, and two members connected to said cutting portion, a support structure for supporting the cutting device above the holding tank so that the cutting device can extend into the product, cutter connecting means for connecting said cutting device to said support structure and comprising a shaft connected to said members and rotatably supported by said support structure, and means for fully extending said cutting device into and for completely retracting said cutting device from said holding tank, said extending and retracting means comprising a first sprocket fixed on said shaft, a second sprocket larger than said first sprocket and rotatably mounted on said support structure, an actuator lever attached to said second sprocket, a chain drivably connecting said first and second sprockets, and means for moving said lever to extend and retract said cutting device.

11. An apparatus for processing a mixture to produce a product such as cottage cheese, said apparatus comprising a holding tank for holding the mixture, stirring equipment for stirring the mixture, said stirring equipment includes a paddle with an upper end, a support structure for supporting said stirring equipment above said holding tank so that said stirring equipment can fully extend into the mixture, and means connected between the support structure and the stirring equipment for completely retracting and stirring equipment from the mixture, said retracting means includes a crank connected to said paddle below said upper end, a first link pivotally connected to said support structure, a second link connecting said first link to said upper end of said paddle, means for rotating said crank, and means for pivoting said link.

12. An apparatus for processing a mixture to produce a product such as cottage cheese, said apparatus comprising a holding tank for holding the product, a cutting device for cutting the product, said cutting device comprising a cutting portion, and two members connected to said cutting portion, a support structure for supporting said cutting device above said holding tank, so that said cutting device can extend into the product, moving machinery for moving said support structure and said cutting device horizontally along said holding tank so that said cutting device can cut the product in one direction, and means for causing reciprocative movement at regular intervals of said cutting device perpendicular to said one direction as said cutting device moves along said holding tank, so that said cutting device can cut the product in a direction perpendicular to said one direction, said means for causing reciprocative movement comprising cutter connecting means for connecting said cutting device to said support structure, said cutter connecting means comprising a horizontal shaft connected to said members and supported by said supporting structure for sliding movement perpendicular to said one direction, and reciprocative means for causing the reciprocative movement of said cutter connecting means at regular intervals perpendicular to said one direction as said support structure and said cutting device move along said holding tank, said reciprocative means comprising a plate on said shaft, and solenoid means connected to said support structure and adjacent said shaft and operative on said plate for causing reciprocative movement of said shaft.

13. An apparatus for processing a mixture to produce a product such as cottage cheese, said apparatus comprising a holding tank for holding the product, a cutting device for cutting the product, said cutting device comprising a cutting portion, and two members connected to said cutting portion, a support structure for supporting said cutting device above said holding tank so that said cutting device can extend into the product, moving machinery for moving said support structure and said cutting device horizontally along said holding tank so that said cutting device can cut the product in one direction, means for causing reciprocative movement at regular intervals of said cutting device perpendicular to said one direction as said cutting device moves along said holding tank, so that said cutting device can cut the product in a direction perpendicular to said one direction, said means for causing reciprocative movement comprising cutter connecting means for connecting said cutting device to said support structure, said cutter connecting means including a shaft connected to said members and rotatably supported by said support structure, and means for extending said cutting device into said holding tank and for retracting said cutting device from said holding tank, said extending and retracting means comprising a first sprocket fixed on said shaft, a second sprocket larger than said first sprocket and rotatably mounted on said support structure, an actuator lever attached to said second sprocket, a chain drivably connecting said first and second sprockets, and means for moving said lever to extend and retract said cutting device, and reciprocative means for causing reciprocative movement of said cutter connecting means at regular intervals perpendicular to said one direction as said support structure and said cutting device move along said holding tank.

14. An apparatus for processing a mixture to produce a product such as cottage cheese, said apparatus comprising a holding tank for holding the mixture, stirring equipment for stirring the mixture and including a paddle with an upper end, a cutting device for cutting the product, a support structure for supporting said cutting device and said stirring equipment above said holding tank, so that said cutting device and said stirring equipment can extend into the mixture or product, and means connected between said support structure and said stirring equipment for retracting said stirring equipment from the mixture so that said cutting device can be extended into the product, said retracting means including a crank connected to said paddle below said upper end, a first link pivotally connected to said support structure, a second link connecting said first link to said upper end of said paddle, means for rotating said crank, and means for pivoting said link.

15. An apparatus for processing a mixture to produce a product such as cottage cheese, said apparatus comprising a holding tank for holding the mixture, stirring equipment for stirring the mixture, a cutting device for cutting the product, said cutting device comprising a cutting portion and two members connected to said cutting portion, a support structure for supporting said cutting device and said stirring equipment above said holding tank so that said cutting device and said stirring equipment can extend into the mixture or product, means connected between said support structure and said stirring equipment for retracting said stirring equipment from the mixture so that said cutting device can be extended into the product, and cutter connecting means for connecting said cutting device to said support structure and comprising a shaft connected to said members and rotatably supported by said support structure, and means for extending said cutting device into said holding tank and for retracting said cutting device from said holding tank, said extending and retracting means comprising a first sprocket fixed on said shaft, a second sprocket larger than said first sprocket and rotatably mounted on said support structure, an actuator lever attached to said second sprocket, a chain drivably connecting said first and second sprockets, and means for moving said lever to extend and retract said cutting device.

16. An apparatus for processing a mixture to produce a product such as cottage cheese, said apparatus comprising a holding tank for holding the product, a cutting device for cutting the product, said cutting device comprising a cutting portion and two members connected to the cutting portion, a support structure for supporting the cutting device above said holding tank so that said cutting device can extend into the product, cutter connecting means for connecting the cutting device to the support structure and comprising a horizontal shaft connected to said two members and supported by the supporting structure for rotational movement relative thereto, and means for extending said cutting device into and for retracting said cutting device from said holding tank, said extending and retracting means comprising a first sprocket fixed on said shaft, a second sprocket larger than said first sprocket and rotatably mounted on said support structure, an actuator lever attached to said second sprocket, a chain driveably connecting said first and second sprockets, and means for moving said lever to extend and retract said cutting device.

* * * * *